US007552439B2

(12) United States Patent
Fox et al.

(10) Patent No.: US 7,552,439 B2
(45) Date of Patent: Jun. 23, 2009

(54) SYSTEM AND METHOD TO ALLOW NON-DETERMINISTIC EXECUTION IN A PROCESS CONTROL SYSTEM

(75) Inventors: Gary L. Fox, Glendale, AZ (US); Lawrence L. Martin, Phoenix, AZ (US); Robert J. McNulty, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 486 days.

(21) Appl. No.: 11/390,911

(22) Filed: Mar. 28, 2006

(65) Prior Publication Data

US 2007/0233282 A1 Oct. 4, 2007

(51) Int. Cl.
*G06F 9/46* (2006.01)
*G05B 11/01* (2006.01)
*G06F 3/00* (2006.01)
*G06F 5/00* (2006.01)
*G06F 15/76* (2006.01)
*G06F 9/44* (2006.01)
*G06F 13/00* (2006.01)

(52) U.S. Cl. ............... 718/107; 700/18; 700/23; 710/56; 712/28; 719/311; 719/319

(58) Field of Classification Search ......... 718/100, 718/102, 105–107; 709/223, 225, 250; 700/2, 700/4, 17, 18, 20, 23; 714/1, 2, 15, 20; 719/311–313, 719/319, 320; 710/5, 6, 52, 56; 712/28–31, 712/220, 245
See application file for complete search history.

(56) References Cited

U.S. PATENT DOCUMENTS

| | | | | |
|---|---|---|---|---|
| 6,633,942 B1 * | 10/2003 | Balasubramanian | ........ | 710/264 |
| 6,760,782 B1 * | 7/2004 | Swales | ........ | 709/250 |
| 6,799,077 B1 | 9/2004 | Hauet | | |
| 6,832,367 B1 * | 12/2004 | Choi et al. | ........ | 717/130 |
| 7,269,464 B2 * | 9/2007 | Phillips et al. | ........ | 700/18 |
| 7,302,684 B2 * | 11/2007 | Hsieh | ........ | 718/102 |
| 2004/0098141 A1 | 5/2004 | Martin | | |
| 2004/0117535 A1 * | 6/2004 | Schaftlein et al. | ........ | 710/301 |
| 2004/0158830 A1 * | 8/2004 | Chung et al. | ........ | 718/1 |
| 2004/0172635 A1 * | 9/2004 | Watt et al. | ........ | 719/318 |
| 2004/0226013 A1 * | 11/2004 | Mariotti et al. | ........ | 718/100 |
| 2006/0212132 A1 * | 9/2006 | Vothknecht et al. | ........ | 700/1 |
| 2007/0011660 A1 | 1/2007 | Garyali et al. | | |

FOREIGN PATENT DOCUMENTS

EP 1116077 B1 10/2003

OTHER PUBLICATIONS

Goldberg K., et al., Beyond the Web, Manipulating the Real World, Computer Networks and ISDN Systems, N. Holland Pub., Amsterdam, NL, vol. 28, No. 1, Dec. 1995, pp. 209-219.

* cited by examiner

*Primary Examiner*—Crystal J Barnes Bullock
(74) *Attorney, Agent, or Firm*—Munck Buttus, P.C.

(57) ABSTRACT

A method includes receiving at least one process control value from a deterministic process control environment according to an execution cycle of the deterministic process control environment. The method also includes providing the at least one process control value to a non-deterministic process according to an execution cycle of the non-deterministic process. The execution cycle of the non-deterministic process does not correspond to the execution cycle of the deterministic process control environment.

21 Claims, 3 Drawing Sheets

SYSTEM AND METHOD TO ALLOW NON-DETERMINISTIC EXECUTION IN A PROCESS CONTROL SYSTEM

TECHNICAL FIELD

This disclosure relates generally to process control systems and more particularly to a system and method to allow non-deterministic execution in a process control system.

BACKGROUND

In a typical process control system for a fast changing or volatile process, execution of control strategies often requires that the control system be deterministic. However, quite often there is a need to perform some operations as part of the control strategy that are not deterministic with regards to time. For example, calculating over a large number of process data points or accessing computer disk files can take an indeterminate amount of time.

This problem typically requires a control engineer to employ a different design model to manage and execute the non-deterministic control algorithms, which results in added costs and complexity. Control engineers desire an integrated, single control system for both deterministic and non-deterministic algorithms.

SUMMARY

This disclosure provides a system and method to allow non-deterministic execution in a process control system.

In a first embodiment, a method includes receiving at least one process control value from a deterministic process control environment according to an execution cycle of the deterministic process control environment. The method also includes providing the at least one process control value to a non-deterministic process according to an execution cycle of the non-deterministic process. The execution cycle of the non-deterministic process does not correspond to the execution cycle of the deterministic process control environment.

In particular embodiments, the method also includes storing the at least one process control value until the non-deterministic process can receive the at least one process control value.

In other particular embodiments, the method also includes receiving at least one result value from the non-deterministic process according to the execution cycle of the non-deterministic process and providing the at least one result value to the deterministic process control environment according to the execution cycle of the deterministic process control environment. In yet other particular embodiments, the method further includes storing the at least one result value until the deterministic process control environment can receive the at least one result value.

In a second embodiment, a proxy module in a process control system includes a data storage that is configured to receive at least one process control value from a deterministic process control environment according to an execution cycle of the deterministic process control environment. The data storage is also configured to provide the at least one process control value to a non-deterministic process according to an execution cycle of the non-deterministic process. The execution cycle of the non-deterministic process does not correspond to the execution cycle of the deterministic process control environment.

In a third embodiment, a deterministic process control environment includes a deterministic process, a non-deterministic process, and a proxy module. The proxy module is configured to receive at least one process control value from the deterministic process according to an execution cycle of the deterministic process. The proxy module is also configured to provide the at least one process control value to the non-deterministic process according to an execution cycle of the non-deterministic process.

In a fourth embodiment, a computer program is embodied on a computer readable medium and is capable of being executed by a processor. The computer program includes computer readable program code for receiving at least one process control value from a deterministic process control environment according to an execution cycle of the deterministic process control environment. The computer program also includes computer readable program code for providing the at least one process control value to a non-deterministic process according to an execution cycle of the non-deterministic process. The execution cycle of the non-deterministic process does not correspond to the execution cycle of the deterministic process control environment.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
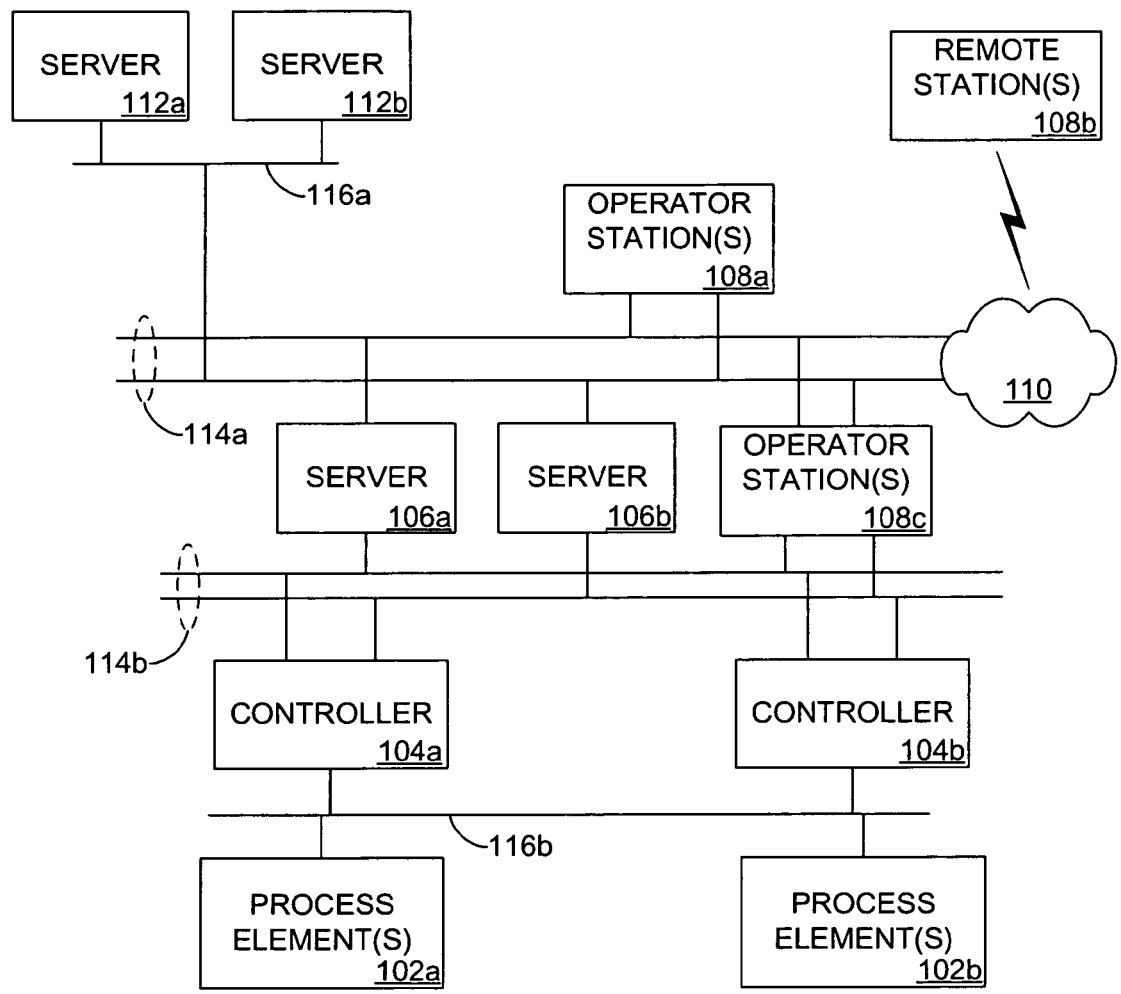
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent motors, catalytic crackers, valves, and other industrial equipment in a production environment. The process elements 102a-102b could represent any other or additional components in any suitable process or production system. Each of the process elements 102a-102b includes any hardware, software, firmware, or combination thereof for performing one or more functions in a process or production system. While only two process elements 102a-102b are shown in this example, any number of process elements may be included in a particular implementation of the process control system 100.

Two controllers 104a-104b are coupled to the process elements 102a-102b. The controllers 104a-104b control the operation of the process elements 102a-102b. For example, the controllers 104a-104b could be capable of monitoring the operation of the process elements 102a-102b and providing control signals to the process elements 102a-102b. Each of the controllers 104a-104b includes any hardware, software, firmware, or combination thereof for controlling one or more of the process elements 102a-102b. The controllers 104a-104b could, for example, include processors of the POWERPC processor family running any suitable operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. The servers 106a-106b could, for example, represent personal computers (such as desktop computers) executing a MICROSOFT WINDOWS operating system. As another example, the servers 106a-106b could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing user access to the controllers 104a-104b (without using resources of the servers 106a-106b). As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. The operator stations 108a-108c could, for example, represent personal computers having displays and processors executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 also includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116b that support communication between components in the system 100. Each of these networks 114a-114b, 116a-116b represents any suitable network or combination of networks facilitating communication between components in the system 100. The networks 114a-114b, 116a-116b could, for example, represent Ethernet networks. The process control system 100 could have any other suitable network topology according to particular needs.

In one aspect of operation, one or more of the controllers 104a-104b or servers 106a-106b execute, support, or otherwise provide access to an execution environment. The execution environment provides support for various features that managed applications may use during execution. For example, the execution environment could provide support for mathematical functions, input/output functions, and communication functions used by the managed applications. The execution environment could also support compilation of assembly code, management of a heap memory, and any other or additional functions. The phrase "managed application" refers to an application executed in the execution environment, where the execution of the application is managed by the execution environment. Managed applications could include real-time applications used to control the process elements 102a-102b in the system 100.

In these embodiments, the execution environment is deterministic. The term "deterministic" generally refers to the ability to predict or specify the behavior of a program or environment. Additional details of one example deterministic execution environment may be found in U.S. patent application Ser. No. 11/175,848 entitled "Deterministic Runtime Execution Environment and Method," which is hereby incorporated by reference. Because the controllers 104a-104b or servers 106a-106b provide a deterministic execution environment, the system 100 may be said to represent a deterministic control system or a deterministic control environment.

In accordance with this disclosure, the controllers 104a-104b or servers 106a-106b also implement a mechanism that allows a deterministic control environment to perform non-deterministic operations. Control of the non-deterministic operations acts as an integral part of the deterministic control environment. Deterministic and non-deterministic processes, which are described in more detail below, can be executed by the same device, such as the controllers 104a-104b or servers 106a-106b.

In this way, control engineers or other personnel may create control processes that are either deterministic or non-deterministic depending on the time required to execute each process. Control processes and sub-processes represent logic that operates on process control data values. The control processes are included in control strategies, with other processes that may be deterministic or non-deterministic, to perform a control operation. The non-deterministic processes execute such that their execution is distributed across process control environment execution cycles. Each of the non-deterministic processes can execute for as long as it needs without affecting the deterministic nature of the process control environment.

Although FIG. 1 illustrates one example of a process control system 100, various changes may be made to FIG. 1. For example, a control system could include any number of process elements, controllers, servers, and operator stations.

Figure 2:
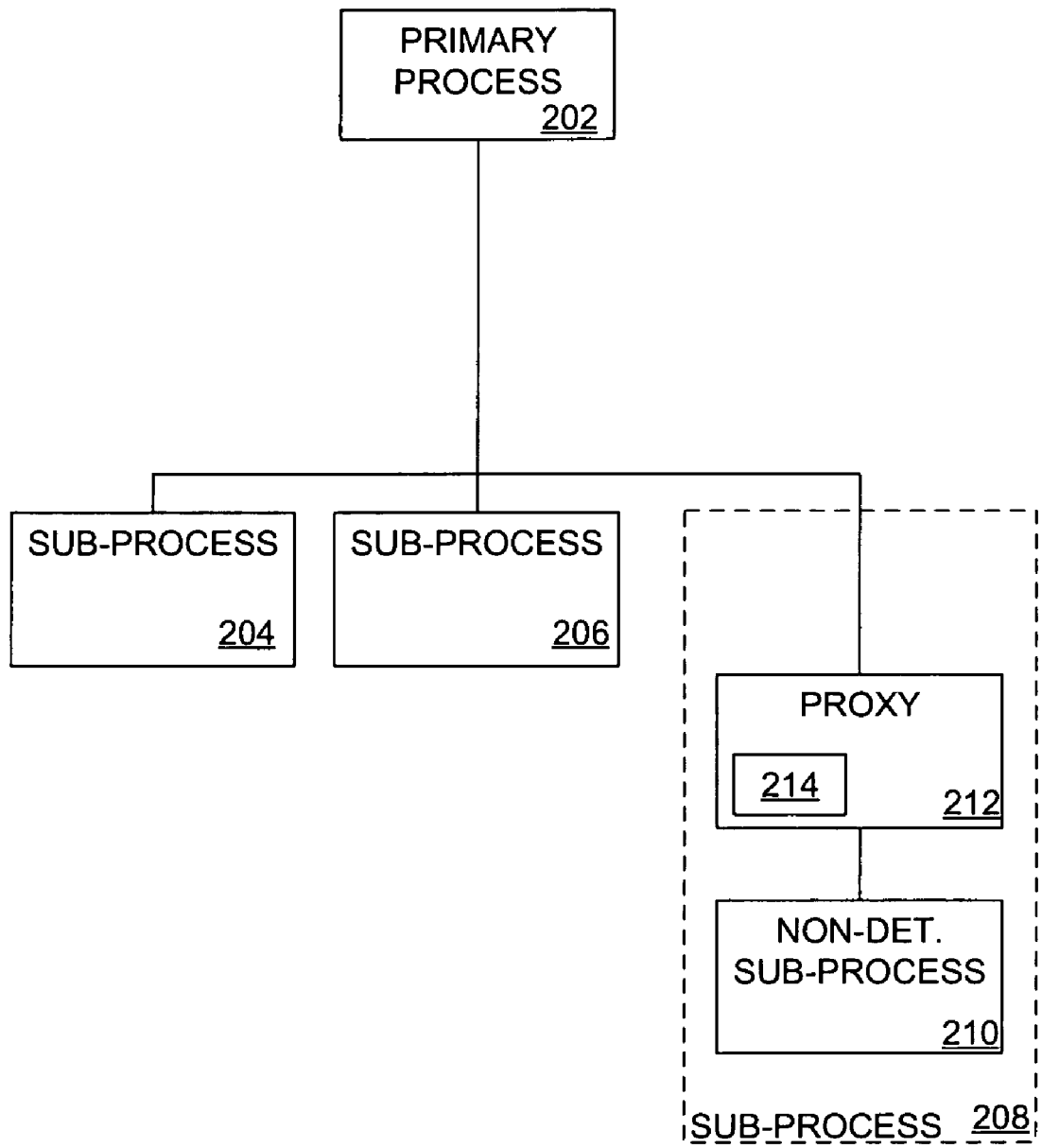
FIG. 2 illustrates example control processes and sub-processes in a process control system according to one embodiment of this disclosure.

FIG. 2 illustrates example control processes and sub-processes in a process control system 100 according to one embodiment of this disclosure. The control processes and sub-processes illustrated in FIG. 2 are for illustration only. Other control processes and sub-processes could be used in a process control system without departing from the scope of this disclosure. Also, for ease of explanation, the control processes and sub-processes shown in FIG. 2 are described with respect to the process control system 100 of FIG. 1. The control processes and sub-processes shown in FIG. 2 could be used with any other suitable device or system.

In this example, a primary process 202 and sub-processes 204-208 together perform a control operation in a process control environment. Each of the process 202 and sub-processes 204-208 can execute on one or more of the servers 106a-106b or controllers 104a-104b as required by a specific implementation, and one or more of the process 202 and sub-processes 204-208 may control the operation of one or more process elements 102a-102b.

In the particular example shown in FIG. 2, the primary process 202 selectively calls the sub-processes 204-208. In this example, the primary process 202, sub-process 204, and sub-process 206 are deterministic processes and are executed in or from a process control environment. The sub-process 208 is a process capable of or requiring non-deterministic execution and is shown as including a non-deterministic sub-process 210.

A process capable of non-deterministic execution (such as the sub-process 208) may appear no different to a control strategy and control processes than a deterministic process (such as the sub-processes 204 and 206). In these embodiments, the process capable of non-deterministic execution may be placed on a periodic execution cycle, as are other processes executed in a deterministic process control environment. The non-deterministic sub-process 208 begins execution when called by the primary process 202. However, the non-deterministic sub-process 208 executes without regard to the completion of the execution cycle of the deterministic process control environment.

To implement non-deterministic execution of a process in conjunction with a deterministic process control environment, a process block (such as sub-process 208) includes two modules: the actual non-deterministic process module (such as sub-process 210) and a proxy module (such as proxy 212). The non-deterministic process module may execute in its own thread outside of the deterministic process control environment, and the proxy module may execute in the deterministic process control environment. Preferably. Proxy 212 still executes as a deterministic process, that is executes on each cycle for which it is scheduled. Preferably, sub-process 210 executes non-deterministically, without regard to the process control system execution, for example, on a separate processing thread.

When the primary process 202 (or any other process or sub-process) calls the sub-process 208, the proxy 212 receives the call and manages the interactions with the calling process. For example, the proxy 212 manages the scheduled execution of the non-deterministic process 210 and processes data values transferred to/from the non-deterministic process 210. As a particular example, the proxy 212 controls the reading/writing of process values by caching the values and providing them to the non-deterministic process 210 at the appropriate time. The non-deterministic process 210 may execute as configured in its own thread, so the non-deterministic process 210 may have little or no impact on the overall deterministic process control environment. In this document, the term "providing" and its derivatives include both an active process (where relevant values are actively transmitted from one element to another) and a passive process (where relevant values are simply read from a first element by a second element, as in reading a memory, register, or the like).

The proxy 212 satisfies any interface requirements and provides any requests to the non-deterministic process 210 at the appropriate time. The proxy 212 also handles requests from the non-deterministic process 210 to the process control environment, and the proxy 212 responds to these requests as if it was an actual deterministic process.

The proxy 212 is also responsible for maintaining a cache of process control values that are accessible by the process control environment. These values may be updated from queued requests through any suitable communication mechanism. The proxy 212 is further responsible for maintaining a cache of result values that are provided by the non-deterministic process 210 and accessible from the process control environment. In addition, the proxy 212 further sends updated process control values to the non-deterministic process 210 when the values are modified from the process control environment. This allows for timely responses to data access requests from the process control environment and maintains the process control values in a "coherent" state as the non-deterministic process 210 executes independently on another thread. The phrase "process control values" refers to any requests or other data provided to the non-deterministic process. The phrase "result values" refers to any requests or other data provided by the non-deterministic process.

The proxy 212 can be implemented using any suitable hardware, software, firmware, or combination thereof. As particular examples, the proxy 212 could be implemented using conventional data processing system hardware and software, as an application-specific integrated circuit, or using other dedicated processing hardware. The proxy 212 could, for example, include a data storage 214 for storing process control values and result values. The data storage 214 can be implemented using any suitable data storage and retrieval device or devices, such as hardware registers, magnetic storage, or random access memory.

The proxy 212 executes within the process control environment just like the other deterministic processes in the process control environment. At certain state transitions, the proxy 212 interacts with the non-deterministic process 210 through any suitable communication mechanism. The communication mechanism facilitates communication between the process control environment and the non-deterministic process 210. In some embodiments, all messages sent through the communication mechanism are captured in "first-in first-out" queues so they can be processed at the appropriate times. In particular embodiments, the messages may have different priorities to allow more important requests to be processed ahead of less important requests.

In some embodiments, to maintain the deterministic behavior of the process control environment, requests to/from the non-deterministic process 210 are only processed during the time that the proxy 212 is executing, and these requests need to be completed within the time allocated to the proxy 212 (as with any other deterministic process). Any request to and responses to prior requests from the non-deterministic process 210 are processed in the proxy 212 when time is available during an execution cycle of the process control environment and not according to the execution of the non-deterministic process 210. If an execution cycle does not have sufficient time available, the proxy 212 may not be able to check for additional requests to/from the non-deterministic process 210 until its next execution cycle. That is, the proxy 212 may include a memory (such as data storage 214) configured to store requests to and responses from the non-deterministic process 210, as well as other data as needed. While the process control environment sends requests to the non-deterministic process 210 as strictly required by its process execution cycles, these requests are queued by the proxy 212 until the non-deterministic process 210 is available to receive them. Similarly, the proxy 212 receives responses from the non-deterministic process 210 whenever they are available and queues them to be read by the process control environment.

In some embodiments, the proxy 212 maintains one or more result registers that contain the most-recent result values received from the non-deterministic process 210. Each time the non-deterministic process 210 returns a new value or values, the result registers are updated with the value(s). In this way, when the process control environment reads the result registers at the specified time in the execution cycle, the most recent values are read each time.

In other particular embodiments, a series of at least one process control values are received from the deterministic process control environment, and the series of at least one process control values are provided to the non-deterministic process in the order the at least one process control values are received.

In some cases, a result value is stored until a subsequent result value is received from the non-deterministic process. In these and other cases, a series of result values are received from the non-deterministic process, and the most-recently-received result values are provided to the deterministic process control environment, or alternatively, the series result values are provided to the deterministic process control environment in the order that they are received. Similarly, in some cases, a series of process control values are received from the deterministic process control environment, and the most-recently-received of these control values are provided to the non-deterministic process, or alternatively, the series process control values are provided to the non-deterministic process control environment in the order that they are received.

In this way, a seamless connection between deterministic and non-deterministic processes in a system is provided. This may help to eliminate the need for a control engineer or other personnel to devise elaborate schemes to allow non-deterministic processes that are not an integrated part of a control environment to interoperate with that control environment.

Although FIG. 2 illustrates one example of the control processes and sub-processes in a process control system 100, various changes may be made to FIG. 2. For example, any number of processes and sub-processes in any suitable combination could be used in a control system. Also, multiple non-deterministic processes can operate within a control system, where each non-deterministic process is associated with a proxy as described above. Each non-deterministic process may be associated with a separate proxy, or a single proxy module can be used to manage multiple non-deterministic processes.

Figure 3:
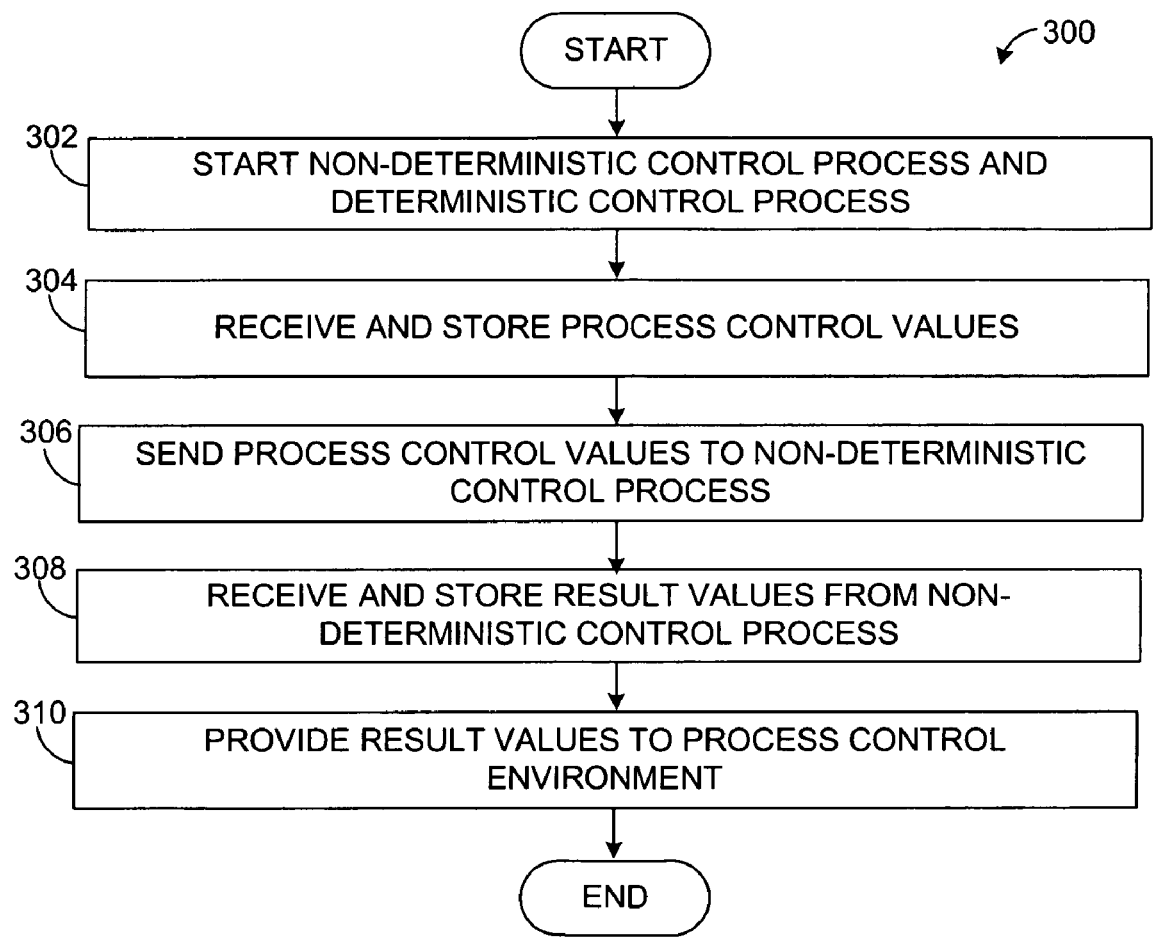
FIG. 3 illustrates an example method for using a non-deterministic process in a deterministic process control system according to one embodiment of this disclosure.

FIG. 3 illustrates an example method 300 for using a non-deterministic process in a deterministic process control system according to one embodiment of this disclosure. For ease of explanation, the method 300 is described with respect to the processes and sub-processes of FIG. 2 operating in the process control system 100 of FIG. 1. The method 300 could be used by any suitable device and in any suitable system.

A non-deterministic control process 210 and at least one deterministic control process 202 are started in the process control system 100 at step 302. For ease of explanation, the deterministic control process or processes are referred to as a process control environment.

A proxy 212 receives and stores process control values from the process control environment at step 304. For example, the proxy 212 could receive one or more process control values at the appropriate point during the execution cycle of the process control environment. The proxy 212 could store the values in the data storage 214.

The proxy 212 sends the process control values to the non-deterministic control process 210 at step 306. For example, the proxy 212 could send one or more of the stored process control values at a time when the non-deterministic control process 210 can receive them. The time at which the non-deterministic control process 210 can receive the process control values is not required to be the same time as they are available in the execution cycle of the process control environment.

At the completion of one or more process cycles, the proxy 212 receives and stores result values returned by the non-deterministic control process 210 at step 308. Because the process 210 is non-deterministic, the time at which its process cycle is complete and the results are available may have no relation at all to the execution cycles of the process control environment.

At the appropriate point in its execution cycle, the proxy 212 provides the result values to the process control environment at step 310. In particular embodiments, the result values provided by the proxy 212 are always the most recently received result values from the non-deterministic control process 210. In other embodiments, successive result values from the non-deterministic control process 210 are stored so that the process control environment can read them in the order they were received. The result values could be provided to the process control environment in any other suitable manner.

One, some, or all of the steps above may be repeated as necessary for the operation of the overall control process. As described, the proxy 212 acts as an intermediary between the deterministic control processes and at least one non-deterministic control process. The proxy 212 can receive process control values from the process control environment according to its execution cycle and can provide result values to the process control environment according to its execution cycle. As a result, the proxy 212 appears to the process control environment to be a conventional deterministic control process. At the same time, the proxy 212 is providing process control values to a non-deterministic control process 210 as it requires and receiving result values from the non-deterministic control process 210 as they are available. This allows the non-deterministic control process 210 to take as little or as much processing time as required.

Although FIG. 3 illustrates one example of a method 300 for using a non-deterministic process in a deterministic process control system, various changes may be made to FIG. 3. For example, one, some, or all of the steps may occur as many times as needed. Also, while shown as a sequence of steps, various steps in FIG. 3 could occur in parallel or in a different order.

In some embodiments, the various functions performed by the proxy 212 or one or more of the deterministic and non-deterministic processes described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. In some embodiments, an algorithm executing in a non-deterministic process does so in the same fashion as it would if it were executing in a deterministic process. In this case, there is an advantage in that the control engineer does not need to create the algorithm differently for the two processes.

It may be advantageous to set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
receiving multiple process control values from a deterministic process control environment according to an execution cycle of the deterministic process control environment;
storing each of the process control values; and
providing a subset of the process control values to a non-deterministic process according to an execution cycle of the non-deterministic process, wherein the execution cycle of the non-deterministic process does not correspond to the execution cycle of the deterministic process control environment.

2. The method of claim 1, wherein:
a series of process control values are received from the deterministic process control environment; and
only a most-recently-received process control value is provided to the non-deterministic process.

3. The method of claim 1, wherein:
storing each of the process control values comprises storing at least one of the process control values until a subsequent at least one of the process control values is received from the deterministic process control environment.

4. The method of claim 1, further comprising:
receiving at least one result value from the non-deterministic process according to the execution cycle of the non-deterministic process; and
storing the at least one result value until one or more subsequent result values are received from the non-deterministic process.

5. The method of claim 4, wherein:
a series of result values are received from the non-deterministic process; and
only a most-recently-received result value is provided to the deterministic process control environment.

6. The method of claim 1, further comprising:
receiving at least one result value from the non-deterministic process according to the execution cycle of the non-deterministic process; and
providing the at least one result value to the deterministic process control environment according to the execution cycle of the deterministic process control environment.

7. The method of claim 6, further comprising:
storing the at least one result value until the deterministic process control environment can receive the at least one result value.

8. The method of claim 6, wherein:
a series of result values are received from the non-deterministic process; and
the series of result values are provided to the deterministic process control environment in an order that the result values are received.

9. A proxy module in a process control system, the proxy module comprising a data storage, the proxy module configured to:
receive at least one process control value from a deterministic process control environment according to an execution cycle of the deterministic process control environment;
store the at least one process control value in the data storage at least until one or more subsequent process control values are received from the deterministic process control environment; and
provide the one or more subsequent process control values to a non-deterministic process according to an execution cycle of the non-deterministic process, wherein the execution cycle of the non-deterministic process does not correspond to the execution cycle of the deterministic process control environment.

10. The proxy module of claim 9, wherein:
a series of process control values are received from the deterministic process control environment; and
only a most-recently-received process control value is provided to the non-deterministic process.

11. The proxy module of claim 9, wherein the proxy module is further configured to receive at least one result value from the non-deterministic process according to the execution cycle of the non-deterministic process and to store the at least one result value in the data storage.

12. The proxy module of claim 11, wherein the proxy module is configured to store the at least one result value until the deterministic process control environment can receive the at least one result value.

13. The proxy module of claim 11, wherein the proxy module is configured to store the at least one result value until one or more subsequent result values are received from the non-deterministic process.

14. The proxy module of claim 13, wherein:
a series of result values are received from the non-deterministic process; and
only a most-recently-received result value is provided to the deterministic process control environment.

15. A deterministic process control environment, comprising:
a deterministic process;
a non-deterministic process; and
a proxy module configured to:
receive multiple process control values from the deterministic process according to an execution cycle of the deterministic process;
store each of the process control values; and
provide a subset of the process control values to the non-deterministic process according to an execution cycle of the non-deterministic process, wherein the execution cycle of the non-deterministic process does not correspond to the execution cycle of the deterministic process.

16. The deterministic process control environment of claim 15, wherein the proxy module is further configured to receive at least one result value from the non-deterministic process according to the execution cycle of the non-deterministic process and to store the at least one result value.

17. The deterministic process control environment of claim 16, wherein:
a series of result values are received from the non-deterministic process; and
only a most-recently-received result value is provided to the deterministic process control environment.

18. The deterministic process control environment of claim 15, wherein the proxy module is configured to provide an interface for the non-deterministic process to the deterministic process.

19. The deterministic process control environment of claim 15, wherein:
a series of process control values are received from the deterministic process control environment; and
only a most-recently-received process control value is provided to the non-deterministic process.

20. A computer program embodied on a computer readable medium, the computer program comprising computer readable program code for:
receiving at least one process control value from a deterministic process control environment according to an execution cycle of the deterministic process control environment;
storing the at least one process control value at least until one or more subsequent process control values are received from the deterministic process control environment; and
providing the one or more subsequent process control values to a non-deterministic process according to an execution cycle of the non-deterministic process, wherein the execution cycle of the non-deterministic process does not correspond to the execution cycle of the deterministic process control environment.

21. The computer program of claim 20, wherein:
a series of process control values are received from the deterministic process control environment; and
only a most-recently-received process control value is provided to the non-deterministic process.

* * * * *